US012812469B2

(12) United States Patent
Kahn et al.

(10) Patent No.: US 12,812,469 B2
(45) Date of Patent: Nov. 24, 2026

(54) NETWORK TRAFFIC DISTRIBUTION FOR A MULTI-ACCESS SESSION RELATED APPLICATIONS

(71) Applicant: Nokia Technologies Oy, Espoo (FI)

(72) Inventors: Colin Kahn, Murray Hill, NJ (US); Devaki Chandramouli, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 114 days.

(21) Appl. No.: 18/898,076

(22) Filed: Sep. 26, 2024

(65) Prior Publication Data

US 2025/0113250 A1 Apr. 3, 2025

Related U.S. Application Data

(60) Provisional application No. 63/587,284, filed on Oct. 2, 2023.

(51) Int. Cl.
*H04W 28/08* (2023.01)

(52) U.S. Cl.
CPC .................................. *H04W 28/08* (2013.01)

(58) Field of Classification Search
CPC ............ H04W 28/08; H04W 28/0268; H04W 28/0289; H04W 28/02; H04W 36/22; H04W 72/12; H04W 28/00
See application file for complete search history.

(56) References Cited

U.S. PATENT DOCUMENTS

| | | | | |
|---|---|---|---|---|
| 11,689,966 B2 * | 6/2023 | Sahin | H04L 5/0044 370/235 |
| 12,058,568 B2 * | 8/2024 | Sadasiva | H04W 28/10 |
| 2021/0014734 A1 * | 1/2021 | Liu | H04W 28/0942 |
| 2024/0056938 A1 * | 2/2024 | Alasti | H04W 28/08 |
| 2025/0097131 A1 * | 3/2025 | Su | H04L 45/306 |
| 2025/0203675 A1 * | 6/2025 | Gandotra | H04W 28/0268 |
| 2025/0227548 A1 * | 7/2025 | Talebi Fard | H04W 28/0268 |

(Continued)

OTHER PUBLICATIONS

"3rd Generation Partnership Project; Technical Specification Group Services and System Aspects; System architecture for the 5G System (5GS); Stage 2 (Release 18)", 3GPP TS 23.501, V18.2.2, Jul. 2023, pp. 1-694.

(Continued)

*Primary Examiner* — Frantz B Jean
(74) *Attorney, Agent, or Firm* — Barta Jones, PLLC

(57) ABSTRACT

Methods, computer program products, and apparatuses are provided for support of Low Latency, Low Loss and Scalable Throughput (LS4) for non-Third Generation Partnership Project (3GPP) access networks. In a multi-access (MA) protocol data unit (PDU) session, traffic is redistributed by a user equipment (UE) between access networks based on Access Traffic Steering, Switching, Splitting (ATSSS) rules and/or Explicit Congestion Notification (ECN). A user plane function (UPF) may update ECN information in PDUs of uplink traffic based on congestion information for L4S provided by an access network. A UPF redistributes traffic between access networks based on congestion information received via one or more access networks, and the ECN information transmitted in the PDUs may be updated accordingly.

11 Claims, 9 Drawing Sheets

10

(56) References Cited

U.S. PATENT DOCUMENTS

| | | | | |
|---|---|---|---|---|
| 2025/0274810 | A1* | 8/2025 | Talebi Fard | H04W 28/02 |
| 2026/0006108 | A1* | 1/2026 | Yi | H04L 69/161 |

OTHER PUBLICATIONS

Ford et al., "TCP Extensions for Multipath Operation with Multiple Addresses", RFC 8684, Internet Engineering Task Force (IETF), Mar. 2020, pp. 1-68.
Iyengar et al., "QUIC: a UDP-Based Multiplexed and Secure Transport", RFC 9000, Internet Engineering Task Force (IETF), May 2021, pp. 1-151.
Thomson et al., "Using TLS to Secure QUICI", RFC 9001, Internet Engineering Task Force (IETF), May 2021, pp. 1-52.
Iyengar et al., "QUIC Loss Detection and Congestion Control", RFC 9002, Internet Engineering Task Force (IETF), May 2021, pp. 1-42.
"3rd Generation Partnership Project; Technical Specification Group Services and System Aspects; Procedures for the 5G System (5GS); Stage 2 (Release 18)", 3GPP TS 23.502, V18.2.0, Jun. 2023, pp. 1-895.
"3rd Generation Partnership Project; Technical Specification Group Services and System Aspects; Policy and charging control framework for the 5G System (5GS); Stage 2 (Release 18)", 3GPP TS 23.503, V18.2.0, Jun. 2023, pp. 1-182.
"3rd Generation Partnership Project; Technical Specification Group Core Network and Terminals; Non-Access-Stratum (NAS) protocol for 5G System (5GS); Stage 3; (Release 18)", 3GPP TS 24.501, V18.3.1, Jun. 2023, pp. 1-1115.
Indian Provisional Application No. 202341033573, "Apparatus, Method and Computer Program", filed on May 12, 2023, pp. 1-39.

* cited by examiner

NETWORK TRAFFIC DISTRIBUTION FOR A MULTI-ACCESS SESSION RELATED APPLICATIONS

RELATED APPLICATIONS

This patent application claims the benefit of priority of U.S. Provisional Patent Application No. 63/587,284, filed Oct. 2, 2023, which is hereby incorporated by reference.

TECHNOLOGICAL FIELD

An example embodiment relates generally to communication networks and, more particularly, but not exclusively, to apparatuses, method, and computer programs for traffic distribution for a multi-access session for a communications network.

BACKGROUND

A communication network enables communications between two or more communication devices or provides communication devices access to a data network. A communication network may operate in accordance with standards such as those provided by 3GPP (Third Generation Partnership Project) or ETSI (European Telecommunications Standards Institute). Examples of standards are the so-called 5G (5th Generation) standards provided by 3GPP. Previous 3rd Generation Partnership Project (3GPP) releases of Fifth Generation Core network (5GC) have addressed low latency, low loss, and scalable throughput within a data network.

BRIEF SUMMARY

An apparatus is provided, the apparatus comprising means for receiving at least one of (a) Access Traffic Steering, Switching, Splitting (ATSSS) rules for distributing traffic for transmission to at least two nodes configured for access, the at least two access nodes comprising at least one node configured for non-Third Generation Partnership Project (non-3GPP) access, wherein the ATSSS rules are received from a session management function (SMF) and are based on information used for Explicit Congestion Notification (ECN) information provided by a user plane function (UPF), or (b) ECN information in protocol data units (PDU) s received via the at least one node configured for non-3GPP access, and means for distributing traffic for transmission to the at least two nodes based on the at least one of the ATSSS rules or the ECN information.

The apparatus further includes means for updating Explicit Congestion Notification (ECN) information in downlink PDUs, wherein the ECN information in the downlink PDUs indicates uplink congestion at one or more of the at least two nodes, and is based on one or more of: (a) the ECN information received via the at least one node configured for non-3GPP access, or (b) the traffic distribution performed by the apparatus, wherein the downlink PDUs comprising the updated ECN information indicating the uplink congestion are transmitted toward a host. At least one of (a) the distributing of the traffic, or (b) the updating of the ECN information is further based on one or more local conditions comprising at least one of local congestion, network interface availability, signal loss conditions, or user preferences.

According to certain embodiments, at least one of (a) the distributing of the traffic, or (b) the updating of the ECN information is further based on ECN information received via at least another node of the at least two nodes. At least one of (a) the distributing of the traffic, or (b) the updating of the ECN information is further based on combining the ECN information received via the at least two nodes. The apparatus further includes means for sending, in a request for at least one of establishment or modification of a multi-access (MA) (PDU) session for transmission via the at least two nodes, an indication that ATSSS and Low Latency, Low Loss and Scalable Throughput (LAS) are enabled for at least the node configured for non-3GPP access.

An apparatus comprising a user plane function (UPF) for a communication network is also provided, the UPF configured to perform receiving congestion information for Low Latency, Low Loss and Scalable Throughput (L4S), via a node configured for non-Third Generation Partnership Project (non-3GPP) access. The UPF is further configured to perform receiving protocol data units (PDUs) via at least two nodes configured for access, wherein the at least two nodes comprise the node configured for non-3GPP access, and based on at least the received congestion information for L4S, updating Explicit Congestion Notification (ECN) information in the PDUs. The UPF is further configured to transmit the PDUs comprising the updated ECN information toward a host.

The congestion information for L4S comprises a percentage of packets the apparatus is directed to use for L4S. Updating of the ECN information is further based on congestion information for L4S received via at least another node of the at least two nodes. Updating of the ECN information comprises combining the congestion information for L4S received via the at least two nodes to determine the updated ECN information.

The UPF is further configured to perform updating Access Traffic Steering, Switching, and Splitting (ATSSS) rule information based on at least the received congestion information for L4S received via the non-3GPP access node, and providing the updated ATSSS rule information toward a user equipment (UE).

According to certain embodiments, at least one of the updating of the ECN information or the updating of the ATSSS rule information is further based on at least one rule or at least one setting provided by a session management function (SMF).

An apparatus comprising a user plane function (UPF) for a communication network is provided, the UPF configured to perform receiving congestion information for Low Latency, Low Loss and Scalable Throughput (L4S), via a node configured for non-Third Generation Partnership Project (non-3GPP) access, and adjusting traffic distribution of downlink protocol data units (PDUs), based on at least the congestion information for L4S, between at least two nodes configured for access, wherein the at least two nodes comprise the node configured for non-3GPP access.

The UPF is further configured to perform based on at least the received congestion information for L4S, and the adjustment of the traffic distribution, updating Explicit Congestion Notification (ECN) information in the downlink PDUs, wherein the downlink PDUs comprising the updated ECN information are transmitted via at least one of the two nodes.

An apparatus is provided, the apparatus comprising at least one processor, and at least one memory storing instructions, wherein the instructions when executed by the at least one processor cause the apparatus to perform at least receiving at least one of (a) Access Traffic Steering, Switching, Splitting (ATSSS) rules for distributing traffic between at least two nodes configured for access, the at least two nodes comprising at least one node configured for non-Third Generation Partnership Project (non-3GPP) access, wherein the ATSSS rules are received from a session management function (SMF) and are based on information used for Explicit Congestion Notification (ECN) information provided by a user plane function (UPF), or (b) ECN information in protocol data units (PDU) s received via the at least one node configured for non-3GPP access, and means for distributing traffic between the at least two nodes based on the at least one of the ATSSS rules or the ECN information.

The instructions, when executed by the at least one processor, further cause the apparatus to perform at least updating Explicit Congestion Notification (ECN) information in downlink PDUs, wherein the ECN information in the downlink PDUs indicates uplink congestion at one or more of the at least two nodes, and is based on one or more of: (a) the ECN information received via the at least one node configured for non-3GPP access, or (b) the traffic distribution performed by the apparatus, wherein the downlink PDUs comprising the updated ECN information indicating the uplink congestion are transmitted toward a host. At least one of (a) the distributing of the traffic, or (b) the updating of the ECN information is further based on one or more local conditions comprising at least one of local congestion, network interface availability, signal loss conditions, or user preferences.

According to certain embodiments, at least one of (a) the distributing of the traffic, or (b) the updating of the ECN information is further based on ECN information received via at least another node of the at least two nodes. At least one of (a) the distributing of the traffic, or (b) the updating of the ECN information is further based on combining the ECN information received via the at least two nodes. The instructions, when executed by the at least one processor, further cause the apparatus to perform sending, in a request for at least one of establishment or modification of a multi-access (MA) (PDU) session for transmission via the at least two nodes, an indication that ATSSS and Low Latency, Low Loss and Scalable Throughput (L4S) are enabled for at least the node configured for non-3GPP access.

An apparatus comprising a user plane function (UPF) for a communication network is also provided, the apparatus comprising at least one processor, and at least one memory storing instructions, wherein the instructions when executed by the at least one processor cause the apparatus to perform at least receiving congestion information for Low Latency, Low Loss and Scalable Throughput (L4S), via a node configured for non-Third Generation Partnership Project (non-3GPP) access. The instructions, when executed by the at least one processor, further cause the apparatus to perform at least receiving protocol data units (PDUs) via at least two nodes configured for access, wherein the at least two nodes comprise the node configured for non-3GPP access, and based on at least the received congestion information for L4S, updating Explicit Congestion Notification (ECN) information in the PDUs. The instructions, when executed by the at least one processor, further cause the apparatus to perform at least transmitting the PDUs comprising the updated ECN information toward a host.

The instructions, when executed by the at least one processor, further cause the apparatus to perform at least updating Access Traffic Steering, Switching, and Splitting (ATSSS) rule information based on at least the received congestion information for L4S received via the non-3GPP access node, and providing the updated ATSSS rule information toward a user equipment (UE).

An apparatus comprising a user plane function (UPF) for a communication network is provided, the apparatus comprising at least one processor, and at least one memory storing instructions, wherein the instructions when executed by the at least one processor cause the apparatus to perform at least receiving congestion information for Low Latency, Low Loss and Scalable Throughput (L4S), via a node configured for non-Third Generation Partnership Project (non-3GPP) access, and adjusting traffic distribution of downlink protocol data units (PDUs), based on at least the congestion information for L4S, between at least two nodes configured for access, wherein the at least two nodes comprise the node configured for non-3GPP access. The instructions, when executed by the at least one processor, further cause the apparatus to perform at least is further configured to perform based on at least the received congestion information for L4S, and the adjustment of the traffic distribution, updating Explicit Congestion Notification (ECN) information in the downlink PDUs, wherein the downlink PDUs comprising the updated ECN information are transmitted via at least one of the two nodes.

A method is provided, including receiving at least one of (a) Access Traffic Steering, Switching, Splitting (ATSSS) rules for distributing traffic between at least two nodes configured for access, the at least two nodes comprising at least one node configured for non-Third Generation Partnership Project (non-3GPP) access, wherein the ATSSS rules are received from a session management function (SMF) and are based on information used for Explicit Congestion Notification (ECN) information provided by a user plane function (UPF), or (b) ECN information in protocol data units (PDU) s received via the at least one node configured for non-3GPP access, and distributing traffic between the at least two nodes based on the at least one of the ATSSS rules or the ECN information.

The method further includes updating Explicit Congestion Notification (ECN) information in downlink PDUs, wherein the ECN information in the downlink PDUs indicates uplink congestion at one or more of the at least two nodes, and is based on one or more of: (a) the ECN information received via the at least one node configured for non-3GPP access, or (b) the traffic distribution, wherein the downlink PDUs comprising the updated ECN information indicating the uplink congestion are transmitted toward a host.

The method further includes sending, in a request for at least one of establishment or modification of a multi-access (MA) (PDU) session for transmission via the at least two nodes, an indication that ATSSS and Low Latency, Low Loss and Scalable Throughput (L4S) are enabled for at least the node configured for non-3GPP access.

A method for a user plane function (UPF) of a communication network is provided, the method comprising receiving congestion information for Low Latency, Low Loss and Scalable Throughput (L4S), via a node configured for non-Third Generation Partnership Project (non-3GPP) access, and receiving protocol data units (PDUs) via at least two nodes configured for access, wherein the at least two nodes comprise the node configured for non-3GPP access.

The method further includes, based on at least the received congestion information for L4S, updating Explicit Congestion Notification (ECN) information in the PDUs, and transmitting the PDUs comprising the updated ECN information toward a host. The method further incudes updating Access Traffic Steering, Switching, and Splitting (ATSSS) rule information based on at least the received congestion information for L4S received via the non-3GPP access node, and providing the updated ATSSS rule information toward a user equipment (UE).

A method for a user plane function (UPF) of a communication network is provided, the method comprising receiving congestion information for Low Latency, Low Loss and Scalable Throughput (L4S), via a node configured for non-Third Generation Partnership Project (non-3GPP) access, and adjusting traffic distribution of downlink protocol data units (PDUs), based on at least the congestion information for L4S, between at least two nodes configured for access, wherein the at least two nodes comprise the node configured for non-3GPP access. The method further comprises, based on at least the received congestion information for L4S, and the adjustment of the traffic distribution, updating Explicit Congestion Notification (ECN) information in the downlink PDUs, wherein the downlink PDUs comprising the updated ECN information are transmitted via at least one of the two nodes.

A computer program product is provided, comprising at least one non-transitory computer-readable storage medium having computer-executable program code instructions stored therein, the computer-executable program code instructions comprising program code instructions to receive at least one of (a) Access Traffic Steering, Switching, Splitting (ATSSS) rules for distributing traffic between at least two nodes configured for access, the at least two nodes comprising at least one node configured for non-Third Generation Partnership Project (non-3GPP) access, wherein the ATSSS rules are received from a session management function (SMF) and are based on information used for Explicit Congestion Notification (ECN) information provided by a user plane function (UPF), or (b) ECN information in protocol data units (PDU) s received via the at least one node configured for non-3GPP access.

The computer-executable program code instructions comprising program code instructions to distribute traffic between the at least two nodes based on the at least one of the ATSSS rules or the ECN information.

The computer-executable program code instructions comprising program code instructions to update Explicit Congestion Notification (ECN) information in downlink PDUs, wherein the ECN information in the downlink PDUs indicates uplink congestion at one or more of the at least two nodes, and is based on one or more of: (a) the ECN information received via the at least one node configured for non-3GPP access, or (b) the traffic distribution, wherein the downlink PDUs comprising the updated ECN information indicating the uplink congestion are transmitted toward a host. The computer-executable program code instructions further comprise program code instructions to send, in a request for at least one of establishment or modification of a multi-access (MA) (PDU) session for transmission via the at least two nodes, an indication that ATSSS and Low Latency, Low Loss and Scalable Throughput (L4S) are enabled for at least the node configured for non-3GPP access.

A computer program product is provided, comprising at least one non-transitory computer-readable storage medium having computer-executable program code instructions for a user plane function (UPF) of a communication network stored therein, the computer-executable program code instructions comprising program code instructions to receive congestion information for Low Latency, Low Loss and Scalable Throughput (L4S), via a node configured for non-Third Generation Partnership Project (non-3GPP) access.

The computer-executable program code instructions comprising program code instructions to receive protocol data units (PDUs) via at least two nodes configured for access, wherein the at least two nodes comprise the node configured for non-3GPP access, and, based on at least the received congestion information for L4S, updating Explicit Congestion Notification (ECN) information in the PDUs. The computer-executable program code instructions comprising program code instructions to transmit the PDUs comprising the updated ECN information toward a host.

The computer-executable program code instructions comprising program code instructions to update Access Traffic Steering, Switching, and Splitting (ATSSS) rule information based on at least the received congestion information for L4S received via the non-3GPP access node, and provide the updated ATSSS rule information toward a user equipment (UE). At least one of the updating of the ECN information or the updating of the ATSSS rule information is further based on at least one rule or at least one setting provided by a session management function (SMF).

A computer program product is provided, comprising at least one non-transitory computer-readable storage medium having computer-executable program code instructions for a user plane function (UPF) of a communication network stored therein, the computer-executable program code instructions comprising program code instructions to receive congestion information for Low Latency, Low Loss and Scalable Throughput (L4S), via a node configured for non-Third Generation Partnership Project (non-3GPP) access. The computer-executable program code instructions comprising program code instructions to adjust traffic distribution of downlink protocol data units (PDUs), based on at least the congestion information for L4S, between at least two nodes configured for access, wherein the at least two nodes comprise the node configured for non-3GPP access.

The computer-executable program code instructions comprising program code instructions to, based on at least the received congestion information for L4S, and the adjustment of the traffic distribution, update Explicit Congestion Notification (ECN) information in the downlink PDUs, wherein the downlink PDUs comprising the updated ECN information are transmitted via at least one of the two nodes.

The above summary is provided merely for purposes of summarizing some example embodiments of the disclosure so as to provide a basic understanding of some aspects of the disclosure. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE DRAWINGS

Figure 1:
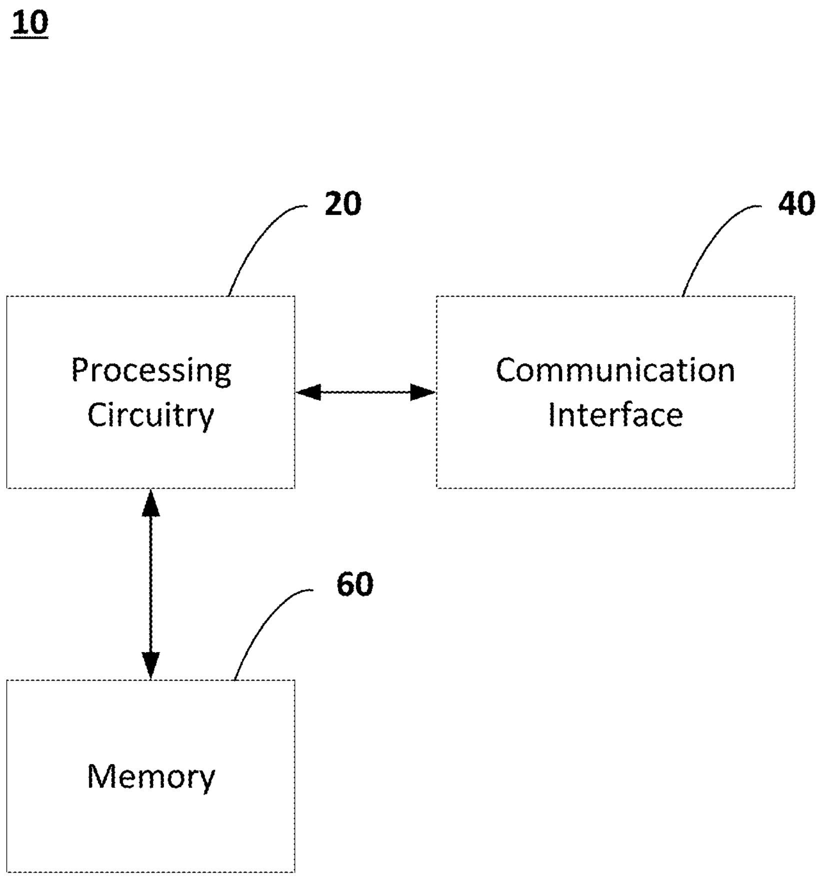
Figure 2:
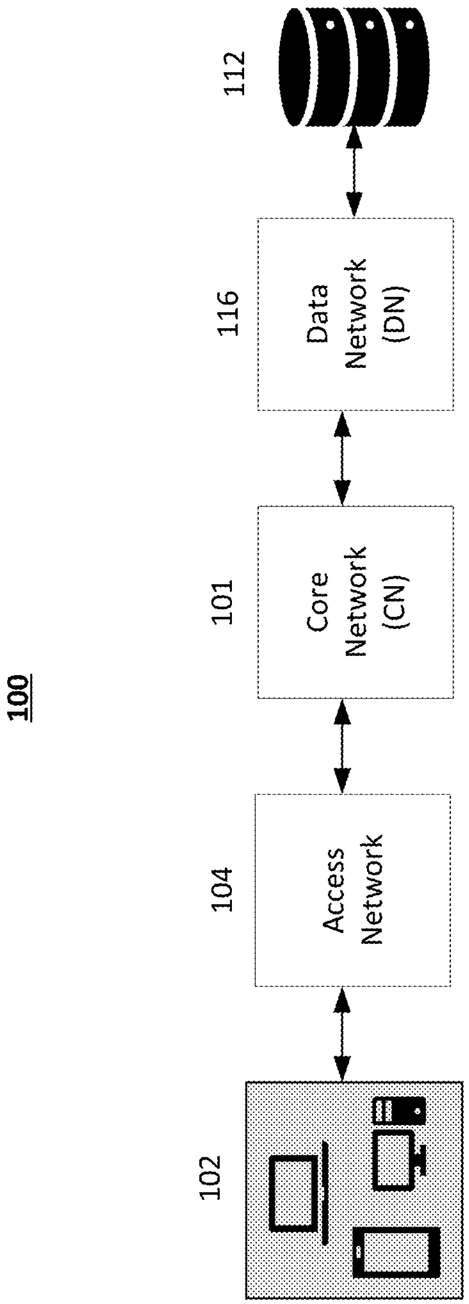
Figure 3:
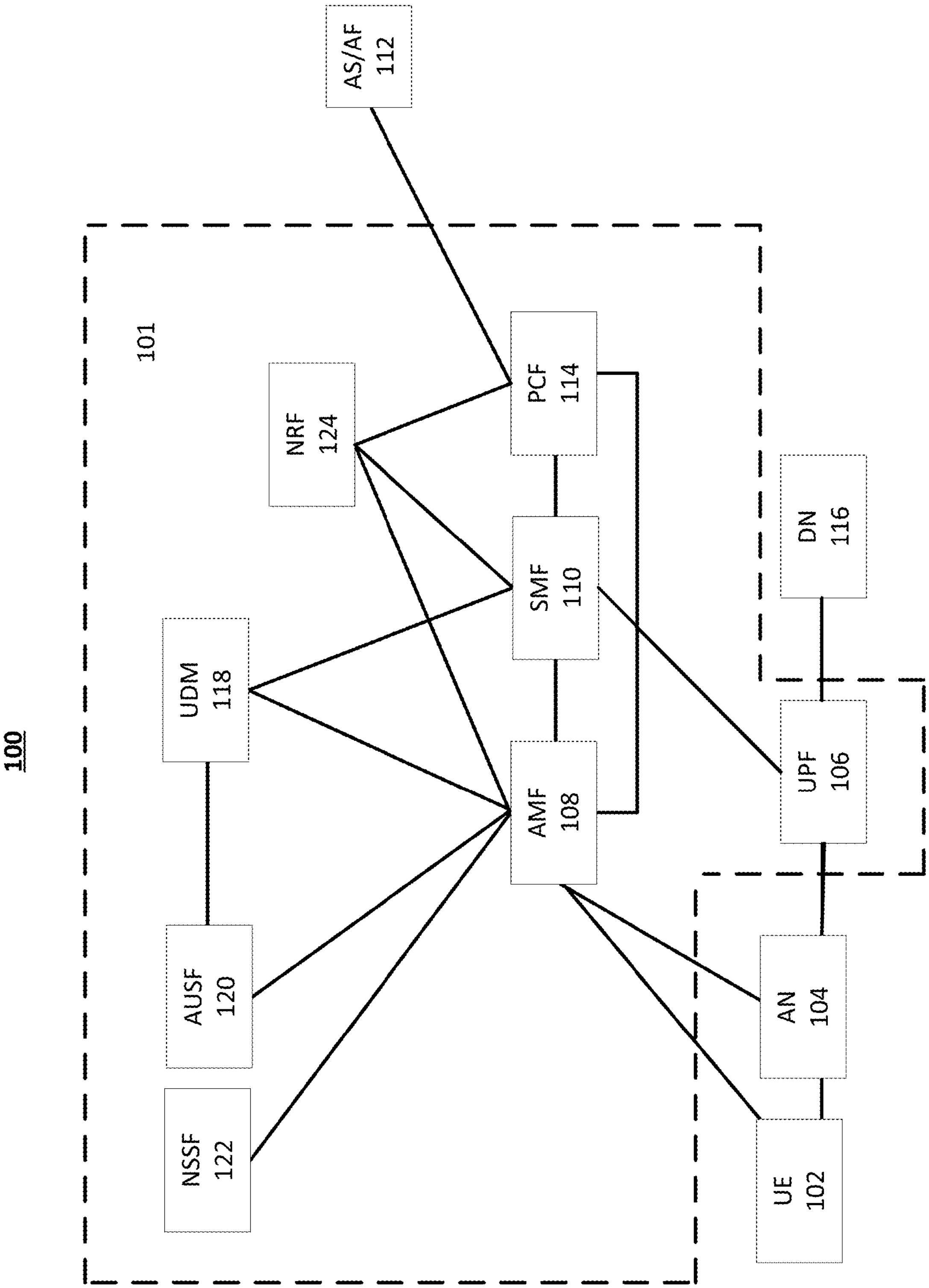
Figure 4:
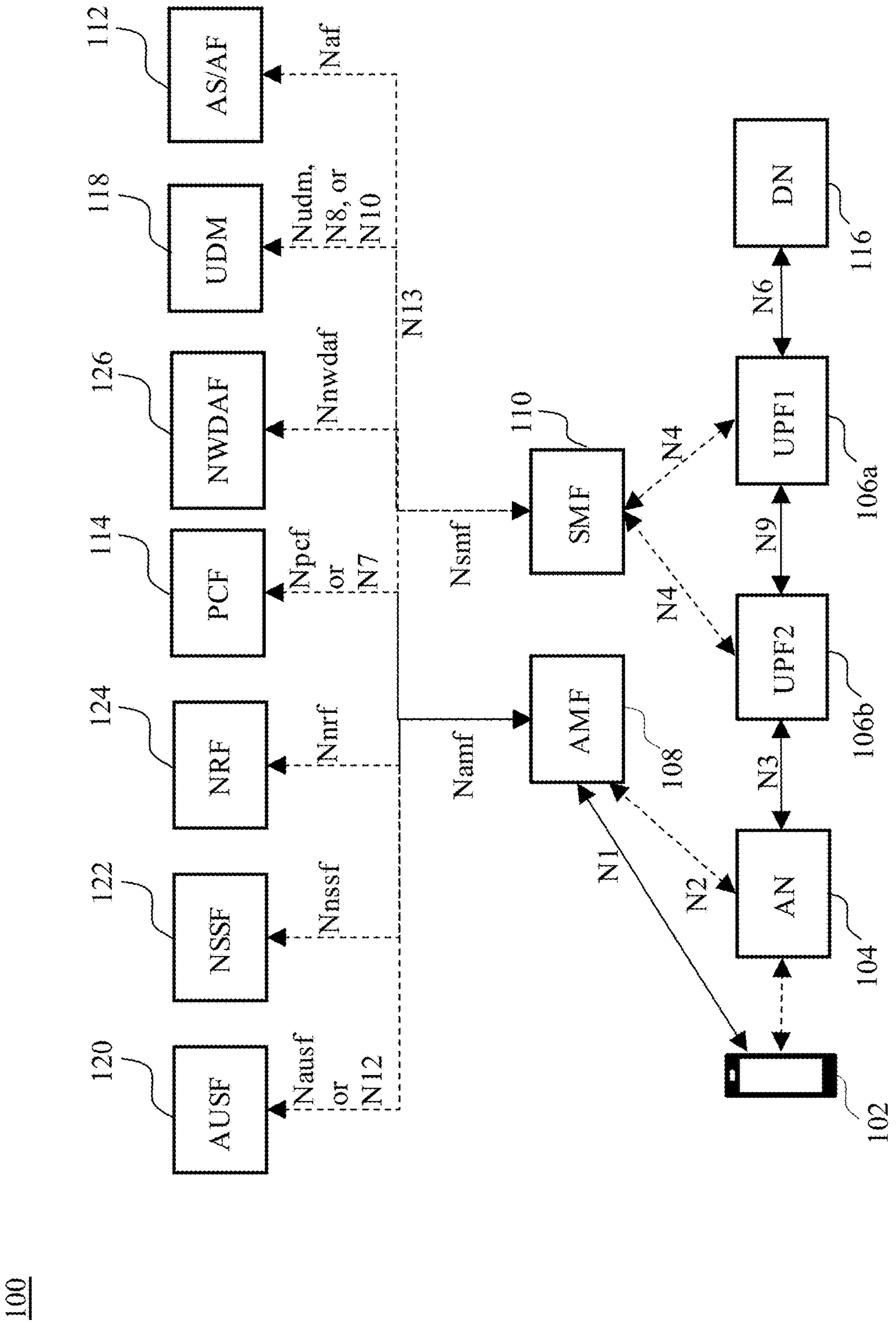
Figure 5:
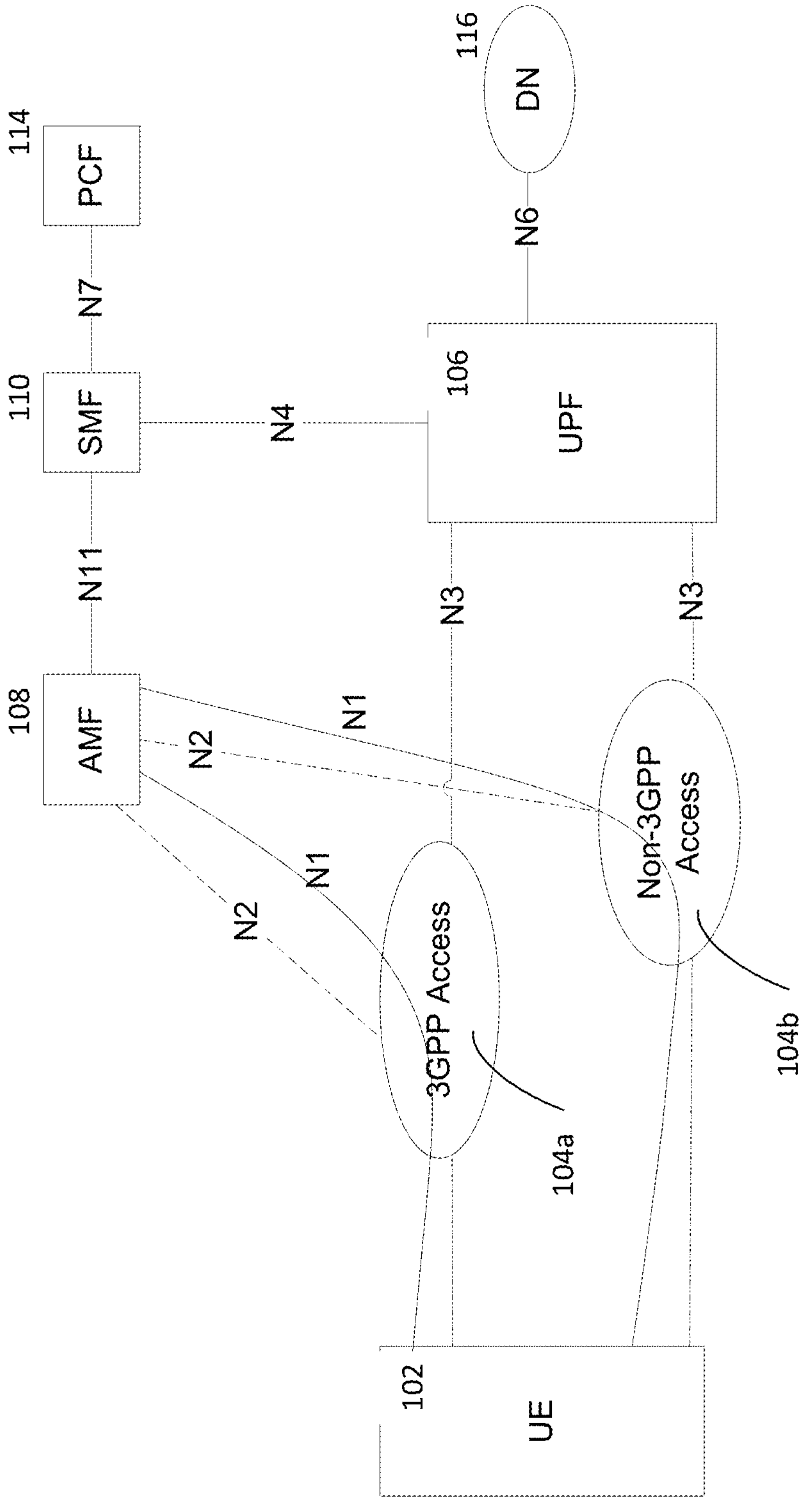
Figure 6:
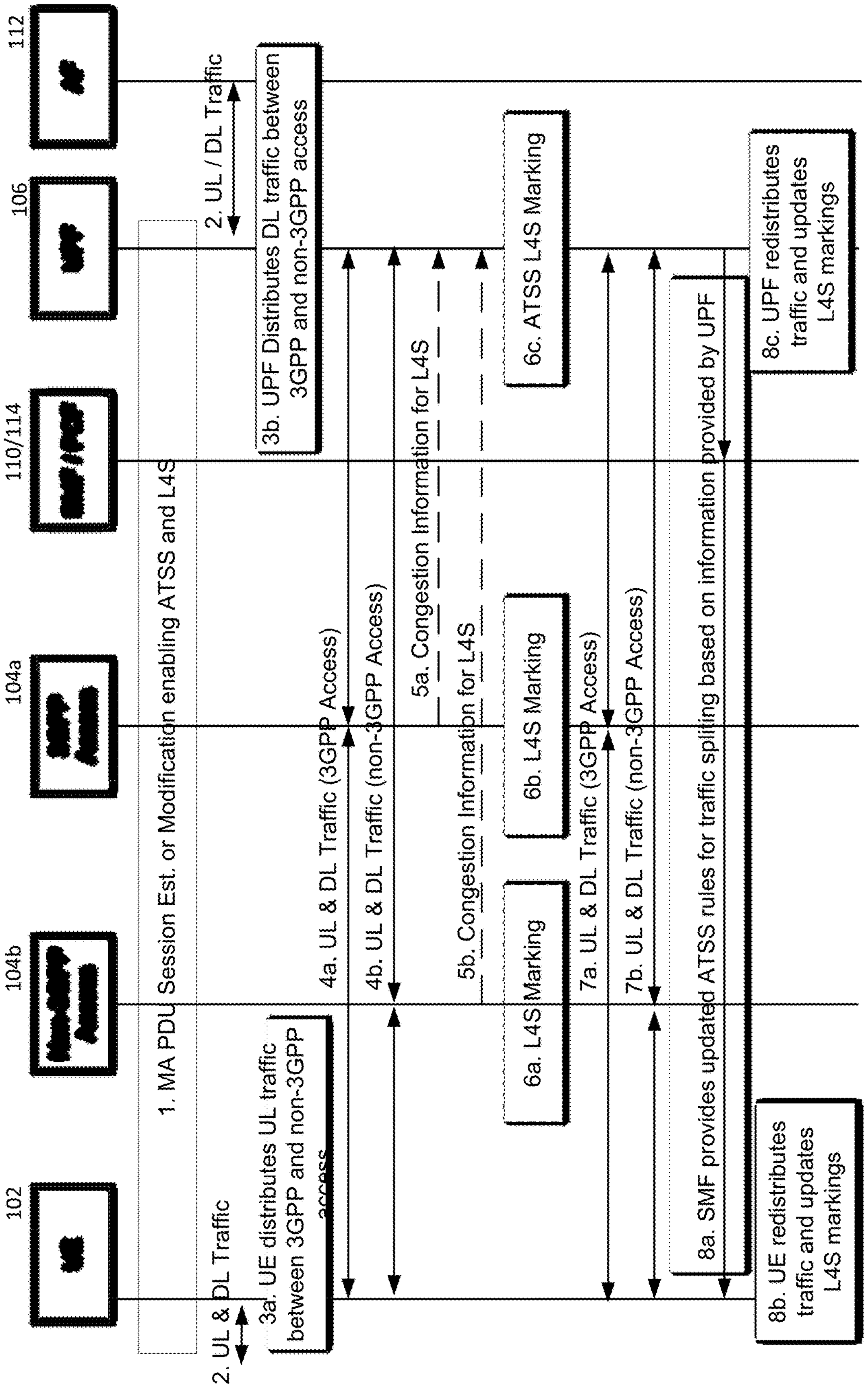
Figure 7:
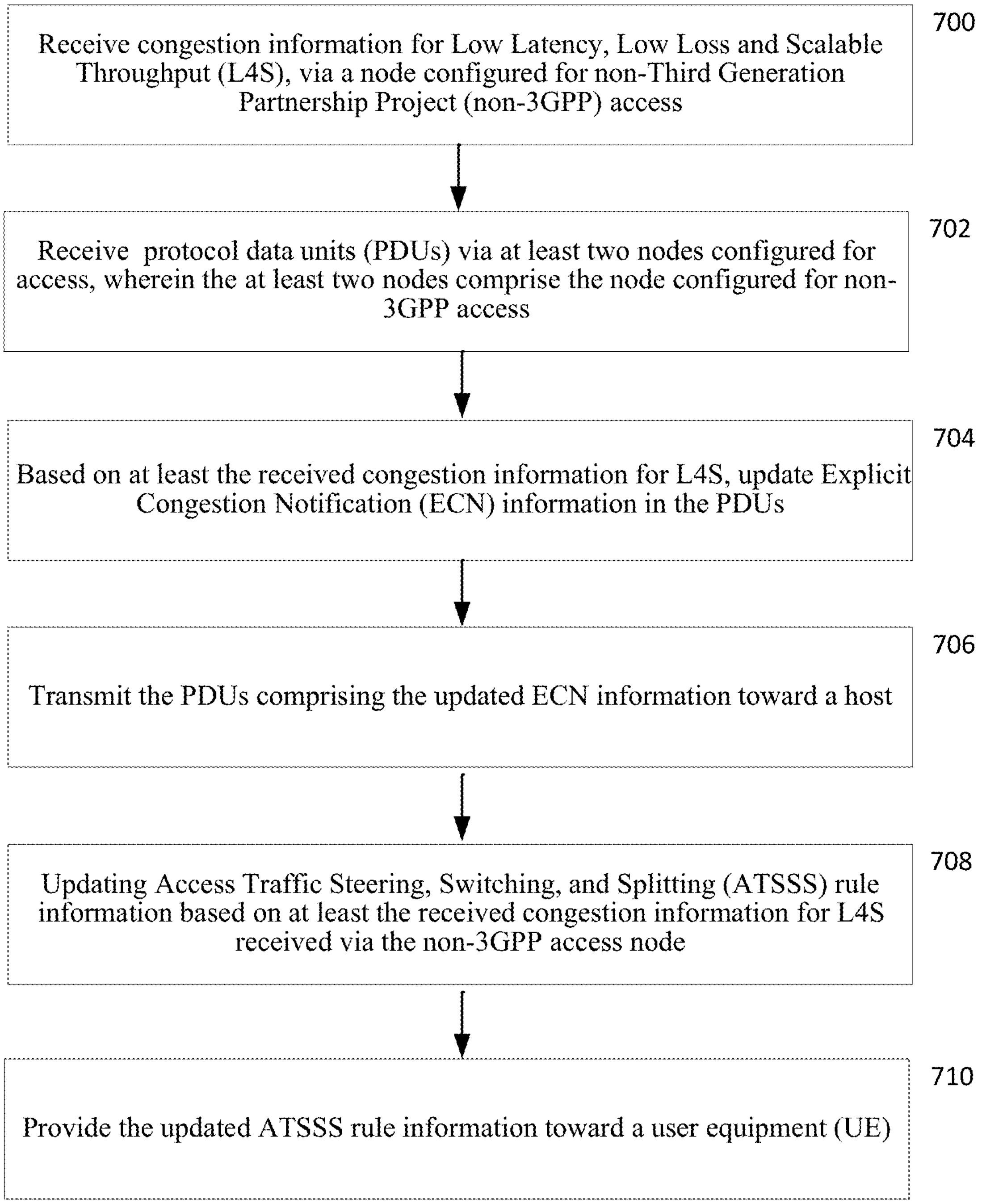
Figure 8:
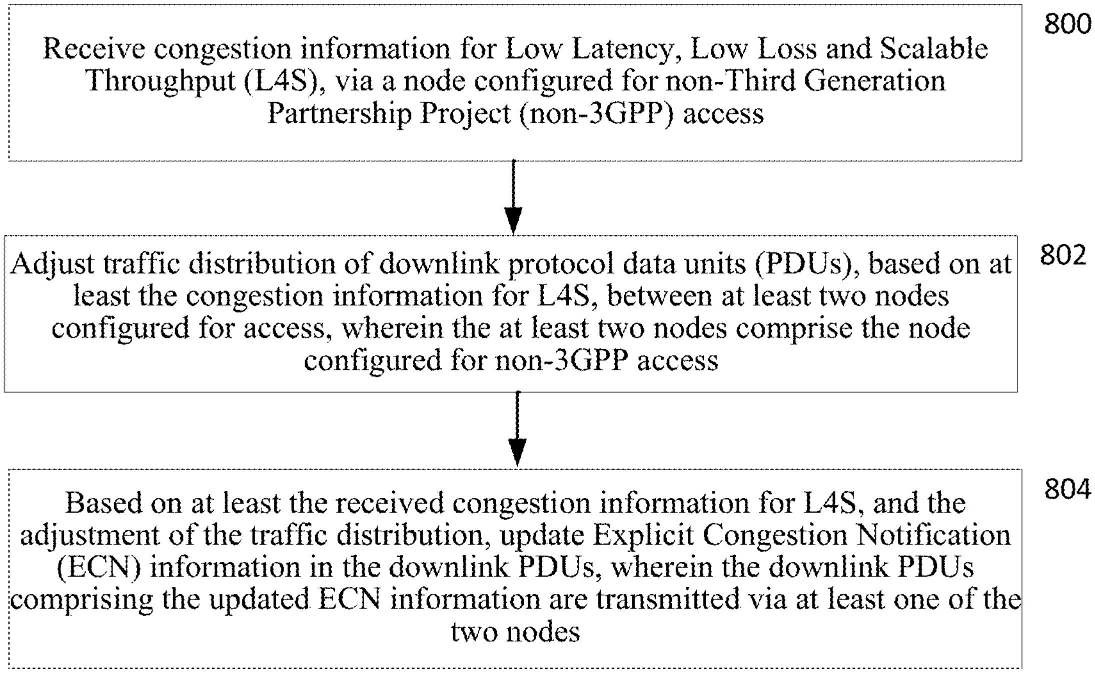
Figure 9:
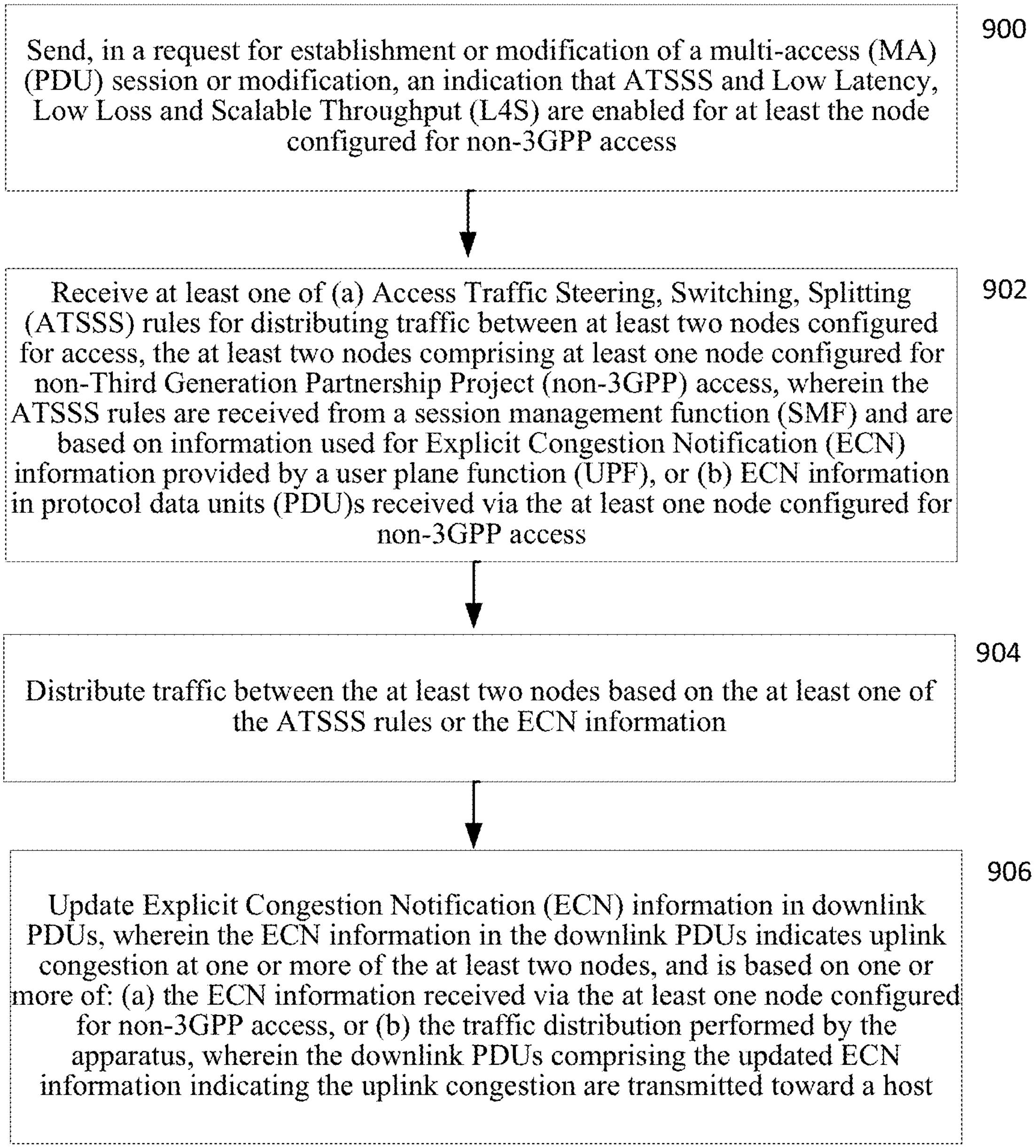

Having thus described certain example embodiments of the present disclosure in general terms, reference will hereinafter be made to the accompanying drawings, which are not necessarily drawn to scale, and wherein:

FIG. 1 is a diagram of an apparatus that may be specifically configured in accordance with certain example embodiments;

FIG. 2 is a diagram of a mobile network according to certain example embodiments;

FIG. 3 is a diagram showing network functions and interfaces of the mobile network of FIG. 2, according to certain example embodiments;

FIG. 4 is a diagram showing network functions and interfaces of the mobile network of FIG. 2, according to certain example embodiments;

FIG. 5 is a diagram showing network functions and interfaces for an MA PDU session utilizing a 3GPP access network and a non-3GPP access network, according to certain example embodiments;

FIG. 6 is a diagram showing a procedure for network traffic distribution for an MA PDU session utilizing a 3GPP access network and a non-3GPP access network, according to certain example embodiments;

FIGS. 7 and 8 are flowcharts of operations that may be performed by a user plane function (UPF) according to certain example embodiments; and FIG. 9 is a flowchart of operations that may be performed by a user equipment (UE) according to certain example embodiments.

DETAILED DESCRIPTION

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device. The evolution of new communication technologies such as Fifth Generation (5G) and Sixth Generation (6G) have improved upon existing technologies such as second generation (2G) technologies, Third Generation (3G) technologies, Fourth Generation (4G) technologies and Long Term Evolution (LTE) technologies and has thus resulted in improved network connectivity.

increased use and advancement of latency sensitive applications including but not limited to extended reality (ER), extended Reality and Media services (ERM), virtual reality, mixed reality, augmented reality, real-time cloud gaming, and/or the like places increased demand on performance on a communication network, and in particular a communication network that operates in accordance with the 3GPP standards. Low Latency, Low Loss and Scalable Throughput (L4S) marking of Explicit Congestion Notification (ECN) bits to indicate congestion is specified in Release 18 of the 3GPP Technical Specific (TS) 23.501. L4S is described in Internet Engineering Task Force (IETF) Request for Change (RFC) 9330 [159], IETF RFC 9331 and IETF RFC 9332 [161]. A Fifth Generation System (5GS) of a communication network may expose congestion information by marking ECN bits in the Internet Protocol (IP) header of the user plane IP packets sent between the user equipment (UE) and the application server. The L4S markings, or ECN information, may trigger application layer rate adaptation by hosts that support L4S.

In 5GS, ECN marking for L4S is enabled on a per Quality of Service (QOS) Flow basis in the uplink and/or downlink direction and may be used for Guaranteed Bit Rate (GBR) and non-GBR QoS Flows. ECN marking for L4S in the IP header is supported in either the Next-Generation Radio Access Network (NG-RAN) or in the Protocol Data Unit (PDU) Session Anchor (PSA) User Place Function (UPF) for 3GPP access. In the case of ECN marking for L4S by the UPF, the Radio Access Network (RAN) uses the General Packet Radio Service (GPRS) Tunneling Protocol User (GTP-U) header of uplink PDUs to report congestion information to the UPF. The UPF uses this information to determine L4S ECN packet marking.

3GPP TS 23.501, clause 5.32, describes Access Traffic Steering, Switching, Spliting (ATSSS). Access Traffic Steering includes selecting an access network for a new data flow and transferring the traffic of this data flow over the selected access network. Access Traffic Switching includes moving all traffic of an ongoing data flow from one access network to another access network in a way that maintains the continuity of the data flow. Access Traffic Splitting includes splitting the traffic of a data flow across multiple access networks. When traffic splitting is applied to a data flow, some traffic of the data flow is transferred via one access and some other traffic of the same data flow is transferred via another access.

When a UE has Multi-Access (MA) PDU Session that terminates in one MA PSA UPF, the UE is simultaneously connected by two access. A UE and/or UPF that supports ATSSS includes a Multipath Transmission Control Protocol (TCP) (MPTCP) Proxy, a MultiPath QUIC (MPQUIC) Proxy and ATSSS Lower Layer (ATSSS-LL). MPTCP and MPQUIC are considered higher layer steering functionalities and are governed by IETF standards (IETF RFC 8684 for MPTCP and IETF RFCs 9000/9001/9002 and multi-path extensions for MPQUIC). ATSSS-LL applies to a variety of data traffic types, including TCP traffic, User Datagram Protocol (UDP) traffic, or Ethernet traffic.

For uplink traffic, the UE applies network provided policy (ATSSS rules) and considers local conditions to decide how traffic is to be distributed across the two access networks. The MA PSA UPF similarly applies network policy and feedback from the UE to decide how to distribute downlink traffic between the N3 and/or N9 tunnels associated with the two access networks.

ATSSS supports the following steering modes, which are specified in ATSSS rules sent to the UE and N4 Multi-Access rules sent to the UPF: "Active-Standby", "Smallest Delay", "Load Balancing", or "Priority-based" or "Redundant." In the case of "Load-Balancing," service data flow (SDF) traffic is split across both accesses. The split is specified in the ATSSS rule sent to the UE. In this regard, the rule contains the percentage of the SDF traffic that should be sent over 3GPP access and over non-3GPP access. In the case of "Priority-based" all the traffic of an SDF is steered to the high priority access, until that access is determined to be congested. Furthermore a "Steering Mode Indicator" indicates if the UE may adjust the traffic steering based on its own decisions (e.g., the UE can perform autonomous load balancing).

3GPP TS 23.501, TS 23.502, and TS 23.503 describe a stage 2 architecture, procedures and a policy for both L4S and ATSSS. However, the procedures and policy for L4S and ATSSS function independently of each other.

L4S ECN marking for L4S is provided by a NG-RAN or UPF of a 5GS to indicate that congestion is occurring on 3GPP access and allow the application and/or application host to adjust the traffic volume that is transmitted. There is no consideration that an alternative access (e.g. non-3GPP access) may be used to redistribute traffic. According to example embodiments provided herein, redistribution of traffic between access nodes, including non-3GPP access nodes, is enabled and may assist the application and/or application host to improve its congestion management to achieve low latency and low loss.

A non-3GPP access network (AN) may include, by way of non-limiting example, untrusted non-3GPP access networks, trusted non-3GPP access networks, Wireline access networks, where Wireline access may be a Wireline 5G Cable Access Network or a Wireline Broadband Forum (BBF) Access Network, a wireless local area network, and/or the like.

Example embodiments provided herein relate to a PSA UPF and/or UE that enable traffic distribution between a plurality of access nodes including a 3GPP access node (e.g., an access node configured for 3GPP access). According to example embodiments, an MA PDU Session for ATSSS is activated for an SDF, and L4S is activated for at least one access. A RAN node and/or access node according to example embodiments either: (a) reports uplink (UL) or downlink (DL) congestion information for L4S to the UPF (e.g., provided in the GTP-U header), or (b) provides L4S marked PDUs for UL or DL traffic to the UPF or UE.

According to example embodiments, if L4S is activated for more than one access, the UPF or UE adjusts the traffic splitting, switching or steering between the accesses using relative L4S markings and/or relative congestion information received from the respective access nodes. Performance Measurements (see TS23.501, clause 5.32.5) may also be used to determine congestion. UPF also notifies the Session Management Function (SMF)/Policy Management Function (PCF) and SMF provides updated ATSSS rules for splitting, switching and steering the traffic over the uplink to the UE. The UE uses the updated ATSSS rules to update the way it steers, switches and splits the traffic. Alternatively, the UE may also split, switch or steer the traffic either based on the L4S markings received in UP packets from the RAN/AN, or the UPF or simply based on the congestion it experiences and the L4S markings it intends to provide to the application layer. Before forwarding PDUs to the application/host, the UPF or UE may adjust L4S marking of PDUs based one or more of the congestion information for L4S (e.g., percentage of packets to be marked for L4S) received on each access and the revised traffic distribution on the accesses.

According to example embodiments, if L4S is active for only one access, the UPF or UE adjusts the traffic splitting, switching or steering between the accesses according to Access Network Performance Measurements (see TS23.501, clause 5.32.5) and L4S markings and/or congestion information for L4S received from one of the accesses. Before forwarding PDUs to the application and/or application host, the UPF or UE may adjust L4S marking of PDUs based the congestion information for L4S received from an access node configured for the access and the adjust the distribution of traffic across the accesses.

When adjusting the traffic distribution, according to example embodiments, the UPF or UE may decide to switch the traffic of a data flow sent by one access to the other access, or it may decide to alter how the data flow is split between the accesses. When adjusting traffic distribution, the UPF may adjust the distribution for the service flow for which L4S marking is being performed, or for other data flows. Example embodiments may adjust the traffic distribution as discussed herein when the ATSSS steering modes are set to certain modes, such as but not limited to "Load Balancing," "Smallest Delay," or "Priority-based."

It will be appreciated that as used herein, the terms "3GPP access" and "non-3GPP access" may be used to refer to any node(s) of the access network, any node(s) that is an access point, any node(s) that support the access network, any node(s) that are configured for the access, and/or any interworking function of the access network. Accordingly, reference to a node configured for access may refer to any of the aforementioned node(s) of an access network. For example, in the case of an untrusted non-3GPP access network, congestion information and/or ECN marking may be provided by a Non-3GPP Inter-Working Function (N3IWF). In the case of a trusted non-3GPP access network, congestion information and/or ECN marking is provided by a Trusted Non-3GPP Gateway Function (TNGF). In the case of a Wireline access network, congestion information and/or ECN marking is provided by a Wireline Access Gateway Function (W-AGF). In the case of a WLAN access, congestion information and/or ECN marking is provided by a Trusted WLAN Interworking Function (TWIF).

Referring to FIG. 1, an apparatus 10 for a communications system, such as the communication system 100 shown in FIGS. 2-5 and described in further detail below. In some embodiments, the apparatus 10 may comprise or implement a network function of the communication system 100 (e.g., a network function, such as UPF, PCF, SMF, and/or the like, of a core network). In some embodiments, the apparatus 10 may be for controlling a node(s) of an access network (e.g., 3GPP access network and/or non-3GPP access network), for controlling any node(s) that is an access point to the access network, any node(s) that supports the access network, for controlling any node(s) that are configured for enabling access a user equipment to access the communication system, and/or for implementing an interworking function of an access network that enables the access network to communication with a core network of the communication system. In some embodiments, the apparatus 10 may be a UE.

As shown in FIG. 1, the apparatus 10 includes processing circuitry 20 (generally referred to herein as a processor), a memory device 60 (generally referred to herein as memory), and a communication interface 40. The processing circuitry 20 may be in communication with the memory device 60 via a bus for passing information between the processing circuitry 40 and the memory 60 of the apparatus 10. The memory 60 may be non-transitory and may include, for example, one or more volatile and/or non-volatile memories. In other words, for example, the memory device 60 may be an electronic storage device (e.g., a computer readable storage medium) comprising gates configured to store data (e.g., bits) that may be retrievable by a machine (e.g., a computing device like the processing circuitry). The memory device 60 may be configured to store information, data, content, applications, instructions, or the like for enabling the apparatus to carry out various operations in accordance with an example embodiment of the present disclosure. For example, the memory device 60 could be configured to buffer input data for processing by the processing circuitry 20. Additionally or alternatively, the memory device 60 could be configured to store instructions for execution by the processing circuitry 20.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein. In the embodiments in which the apparatus 10 implements or comprises a network function of the communication system, may be computing device, such as a standalone computer, a distributed computing system, or a cloud computing system. In some embodiments, a network function of the communication system may be a virtualized network function implemented the apparatus 10 or a cloud native network function implemented on the apparatus 10 (e.g., when the apparatus 10 is a cloud computing system).

The processing circuitry 20 may be embodied in a number of different ways. For example, the processing circuitry 20 may be embodied as one or more of various hardware processing means such as a coprocessor, a microprocessor, a controller, a Digital Signal Processor (DSP), a processing element with or without an accompanying DSP, or various other circuitry including integrated circuits such as, for example, an Application Specific Integrated Circuit (ASIC), a Field Programmable Gate Array (FPGA), a Microcontroller Unit (MCU), a central processing unit (CPU), a multi-core CPU, a graphic processing unit (GPU), a tensor processing unit (TPU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 20 may be configured to execute instructions stored in the memory device 60 or otherwise accessible to the processing circuitry 20. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry 20 is embodied as an executor of instructions, the instructions may specifically configure the processor to perform the algorithms and/or operations described herein when the instructions are executed. However, in some cases, the processing circuitry 20 may be a processor of a specific device (e.g., an extended reality system) configured to employ an embodiment of the present disclosure by further configuration of the processing circuitry by instructions for performing the algorithms and/or operations described herein. The processing circuitry 20 may include, among other things, a clock, an Arithmetic Logic Unit (ALU) and logic gates configured to support operation of the processing circuitry.

The communication interface 40 may be any means such as a device or circuitry embodied in either hardware or a combination of hardware and software that is configured to receive and/or transmit data, including media content in the form of video or image files, one or more audio tracks or the like. In this regard, the communication interface 40 may include, for example, an antenna (or multiple antennas) and supporting hardware and/or software for enabling wireless communications. Additionally or alternatively, the communication interface may include the circuitry for interacting with the antenna(s) to cause transmission of wireless or radio signals via the antenna(s) or to handle receipt of wireless or radio signals received via the antenna(s). In some environments, the communication interface may alternatively or also support wired communication. As such, for example, the communication interface may include a communication modem and/or other hardware/software for supporting communication via cable, Digital Subscriber Line (DSL), Universal Serial Bus (USB) or other mechanisms.

According to example embodiments, apparatus 10 may implement example embodiments and/or components thereof disclosed herein.

FIGS. 2-5 illustrate various examples a communication network 100 (e.g., a mobile network or a telecommunication network). The communication network 100 is configured to enable a user equipment 102 to connect to an application server 112 via an access network 104 and core network 101 (which together form a communication system (e.g., a 5GS) of the communication network 100) and a data network 116. In some embodiments, the communication network 100 can comprise any suitable configuration, number, orientation, positioning, and/or dimensions of components and specialized equipment configured to provide an air interface (e.g., New Radio (NR)) for communication or connection between the User Equipment 102 (UE 102) and the access network 104. As illustrated in FIG. 2, the UE 102 is in operable communication with the access network 104, which in some embodiments is a 5G Access Network (5G-AN) (e.g., 3GPP AN, non-3GPP AN). In some embodiments, UE 102 may be in operable communication with another access network (AN) (not shown) which is connected to the core network 101. Examples of other ANs include non-3GPP access network (AN) s such as, untrusted non-3GPP access networks terminated at a N3IWF, trusted non-3GPP access networks, Wireline access networks terminated at a W-AGF, (where Wireline access may be a Wireline 5G Cable Access Network or a Wireline Broadband Forum (BBF) Access Network), a wireless local area network (WLAN), and/or the like. An access network may include one or more nodes (e.g., base stations, access points, access network nodes, and/or the like). In some embodiments, the access network 104 can communicate with the CN 101 or a network entity or network function of the CN 101 using reference points. In some embodiments, the CN 101 can establish a data connection (e.g., PDU session) between the UE 102 and a UPF of the CN 101. However, it will be appreciated that where embodiments are described in conjunction with 5G-AN (e.g., RAN), R (AN), and 5G, the communication system 100 may include other types of access networks which may be developed in the future.

In some embodiments, the an Application Server (AS) or Application Function (AF) 112 hosted on the AS can be in communication with the CN 101. The AN 104, CN 101, DN 116, and/or AS/AF 112 can be associated with a Network Repository Function (NRF) 124, Secure Copy Protocol (SCP), Security Edge Protection Proxy (SEPP), Policy Control Function (PCF) 114, the like, or any combination thereof.

The communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the AN 104, which can then relay the communications between the UE 102 and the CN 101, the CN 101 being connected to the DN 116, which can be in communication with one or more AS (or AF 112 hosted on the AS). In some embodiments, the UE 102 can be in communication with a (R)AN 104 depicting any 5G-AN, which can act as a relay between the UE 102 and other components or services of the CN 101. For instance, in some embodiments, the UE 102 can communicate with the (R)AN 104, which can in turn communicate with an Access and Mobility Management Function 108 (AMF 108). In other instance or embodiments, the UE 102 can communicate directly with the AMF 108. In some embodiments, the AMF 108 can be in communication with one or more network functions (NFs), such as an Authentication Server Function 120 (AUSF 120), a Network Slice Selection Function 122 (NSSF 122), a Network Repository Function 124 (NRF 124), a Policy Control Function 114 (PCF 114), a Network Data Analytics Function 126 (NWDAF 126), a Unified Data Management function 118 (UDM 118), the AS/AF 112, a Session Management Function 110 (SMF 110), and/or the like using service based interfaces.

In some embodiments, the SMF 110 can be in communication with one or more User Plane Functions 106 (UPF 106, UPF 106*a*, UPF 106*b*, collectively "UPF 106"). By way of example only, in some embodiments, the UPF 106 can be in communication with the (R)AN 104 and the DN 116. In other embodiments, the DN 116 can be in communication with a first UPF 106*a* and the (R)AN 104 can be in communication with a second UPF 106*b*, while the SMF 110 is in communication with both the first and second UPFs 106*a, b* and the first and second UPFs 106*a, b* are in communication each with the other.

In some embodiments, the UE 102 can comprise a single-mode or a dual-mode device such that the UE 102 can be connected to one or more access network (AN) s 104. In some embodiments, in which the AN is a (R)AN, the R (AN) can be configured to implement one or more Radio Access Technologies (RATs), such as Bluetooth, Wi-Fi, and Global System for Mobile Communications (GSM), Universal Mobile Telecommunications Service (UMTS), LTE or 5G NR, among others, that can be used for communicating with the UE 102 and the CN 101. In some embodiments, the (R)AN 104 can implement one or more base stations, for control plane communications between the UE 102 and the AMF 108 of the CN 101.

In some embodiments, the mobile network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some embodiments, the communications network 100 can comprise or employ massive Multiple Input and Multiple Output (massive MIMO) antennas. In some embodiments, the UE 102 and/or the RAN 104 can comprise multi-user MIMO (MU-MIMO) antennas. In some embodiments, the communications network 100 can employ edge computing whereby computing systems of the data network 116 are communicatively, physically, computationally, and/or temporally closer to the communications system (e.g., the UPF of the core network 101) in order to reduce latency and data traffic congestion. In some embodiments, the (R)AN 104 can employ other technologies, devices, or techniques, such as small cell, low-powered (R)AN, beamforming of radio waves, WIFI-cellular convergence, Non-Orthogonal Multiple Access (NOMA), channel coding, and the like.

As illustrated in FIG. 4, a service-based architecture of the CN 101 is shown in which the UE 102 can be configured to communicate with the AN 104 via a N1 interface, e.g., using non-access stratum (NAS) signaling or message. In certain embodiments, such as those in which the AN 104 is a (R)AN, the (R)AN can be configured to communicate with the CN 101 or a network entity or network function thereof (e.g., the AMF 108) via a N2 interface, e.g., between a node of the (R)AN 104 and the AMF 108. The N1 and N2 interfaces are control plane interfaces (otherwise referred to as reference points) In some embodiments, the AN 104 can be configured to communicate with the UPF 106 via a N3 interface, e.g., in a user plane. In some embodiments, the AMF 108 and/or the SMF 110 can be configured to communicate with other network entities or network function of the CN 101 using different interfaces (e.g., service-based interfaces) and/or according to various different protocols. For instance, in some embodiments, the AMF 108 and/or the SMF 110 can be configured to communicate with the AUSF 120 using a Nausf interface or via a N12 interface. In some embodiments, the AMF 108 and/or the SMF 110 can be configured to communicate with the NSSF 122 using an Nnssf interface. In some embodiments, the AMF 108 and/or the SMF 110 can be configured to communicate with the NRF 124 using a Nnrf interface. In some embodiments, the AMF 108 and/or the SMF 110 can be configured to communicate with the PCF 114 using a Npcf interface or via a N7 interface. In some embodiments, the AMF 108 and/or the SMF 110 can be configured to communicate with the NWDAF 126 using a Nnwdaf interface. In some embodiments, the AMF 108 and/or the SMF 110 can be configured to communicate with the UDM 118 using a Nudm interface, via a N8 interface, or via a N10 interface. In some embodiments, the AMF 108 and/or the SMF 110 can be configured to communicate with the AS/AF 112 using a Naf interface. In some embodiments, the SMF 110 can be configured to communicate with the UPF 106 via a N4 interface, which can act as a bridge between the control plane and the user plane, such as acting as a conduit for a Protocol Data Unit (PDU) session during which information is transmitted between, e.g., the UE 102 and the CN 101 or components/services thereof.

FIG. 5 is a diagram showing network functions and interfaces for an MA PDU session established via a 3GPP AN 104*a* (e.g., (R)AN) and a non-3GPP AN 104*b*, according to certain example embodiments. The UE 102 is configured to communicate with an AMF 112 over an N1 or N2 interface via a 3GPP access 104*a* or a non-3GPP access 104*b*. The 3GPP access 104*a* and non-3GPP access 104*b* are configured to communicate with a UPF 106 over an N3 interface.

It will be appreciated that certain example embodiments described herein arise in the context of a telecommunications network, including but not limited to a telecommunications network that conforms to and/or otherwise incorporates aspects of a 5th generation (5G) architecture. While FIGS. 2-5 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a communication network comprising 5th generation communication system, such as illustrated in FIGS. 2-5 and described hereinabove, the described methods, devices, and computer program products can nevertheless be applied in a broader context within any suitable telecommunications network, network, standard, and/or protocol. It will be appreciated that the described methods, devices, and computer program products can further be applied to yet undeveloped future networks and systems as would be apparent to one skilled in the art in light of the present disclosure.

FIG. 6 is a diagram showing a procedure for traffic distribution for an MA PDU session over 3GPP access and a non-3GPP access, according to certain example embodiments.

At operation 1, an MA PDU Session for ATSSS and L4S (e.g., that enables ATSSS and L4S) is established or an existing MA PDU session is modified for ATSSS and L4S. After the MA PDU session for ATSSS and L4S is established (or an existing MA PDU session is modified for ATSSS and L4S), UL traffic (e.g., PDUs) received by the UPF 106 from the UE 102 is transmitted to the AF 112 and DL data (e.g., PDUs) destined for the UE 102 are transmitted by the AF 112 to the UPF 106 as shown in operation 2. As shown in operation 3, the UE 102 and UPF 106 determine how to split the application traffic for transmission over 3GPP and non-3GPP access. As shown in operations 4*a* and 4*b*, UL and DL traffic is transmitted between the UE 102 and the UPF 106 via the 3GPP access and non-3GPP access.

According to certain embodiments provided herein, if the UPF 106 is performing ECN marking for L4S, congestion information for L4S is received from a node configure for 3GPP access (e.g., 3GPP access node 104*a*) and a node configured for non-3GPP access (e.g., non-3GPP access node 104*b*, at respective operations 5*a* and 5*b*.

If the nodes configured for 3GPP and/or non-3GPP accesses are performing ECN marking for L4S, the nodes configured for 3GPP and/or non-3GPP accesses independently determine the ECN marking (without knowledge of the other of the accesses), at respective operations 6*b* and 6*a*. UL and DL traffic (e.g., PDUs) with the ECN markings for L4S is exchanged between the UE 102 and the UPF 106 over 3GPP and non-3GPP access (e.g., via the node configured for 3GPP access and the node configured for non-3GPP access), as shown by operations 7*a* and 7*b*.

According to certain embodiments, at operation 8*a*, based on congestion information for UL flows provided by the nodes configured for 3GPP and non-3GPP access in operations 5*a* and/or 5*b*, the UPF 106 provides (via the SMF 110) updated ATSSS rules to the UE 102 for splitting UL traffic for transmission between 3GPP access 104*a* and non-3GPP access 104*b*.

According to certain embodiments, as shown in operation 8*b*, based on at least one of the ATSSS rules received in step 8*a* and the ECN markings received from the 3GPP and non-3GPP accesses for UL traffic in operations 6*a* and 6*b*, the UE 102 redistributes traffic (e.g., PDUs) for transmission between the 3GPP access 104*a* and non-3GPP access 104*b*, and updates ECN markings sent to the application and/or application host.

As shown in operation 8*c*, based on congestion information provided at operations 5*a* and/or 5*b*, and/or L4S ECN marking received from the access network, the UPF adjusts the distribution of traffic between the 3GPP and non-3GPP access and optionally updates ECN markings sent to the application and/or application host.

FIGS. 7 and 8 are flowcharts of operations that may be performed by a user plane function (UPF) (e.g., an apparatus, such as apparatus 10 that comprises, embodies, or implements a UPF) according to certain example embodiments. FIG. 7 includes operations pertaining to uplink communication, and FIG. 8 includes operations pertaining to downlink communication, but it will be appreciated that a UPF, such as UPF 106, may perform operations of one or both of FIGS. 7 and 8.

At operation 700, the apparatus 10 embodied by a UPF, such as UPF 106, or the like, may include means, such as processing circuitry 20, communication interface 40, memory 60, and/or the like, for receiving congestion information for Low Latency, Low Loss and Scalable Throughput (L4S), via a node configured for non-Third Generation Partnership Project (non-3GPP) access. See for example, operation 5*b* of FIG. 6.

At operation 702, the apparatus 10 embodied by a UPF, such as UPF 106, or the like, may include means, such as processing circuitry 20, communication interface 40, memory 60, and/or the like, for receiving protocol data units (PDUs) via at least two nodes configured for access, wherein the at least two nodes comprise the node configured for non-3GPP access. See, for example, at least operations 4*a* and 4*b* of FIG. 6.

At operation 704, the apparatus 10 embodied by a UPF, such as UPF 106, or the like, may include means, such as processing circuitry 20, communication interface 40, memory 60, and/or the like, for based on at least the received congestion information for L4S, updating Explicit Congestion Notification (ECN) information in the PDUs. See, for example, operation 8*c* of FIG. 6. The congestion information for L4S may include a percentage of packets the apparatus is directed to use for L4S. According to certain embodiments, the updating of the ECN information is further based on congestion information for L4S received via at least another node of the at least two nodes. According to certain embodiments, updating the ECN information is further based on at least one rule or at least one setting provided by a session management function (SMF). In this regard, a rule relating to multi-access (MA) is sent to the UPF (from the SMF) and influences how PDUs are sent over the multiple accesses. A parameter setting therein, such as a steering mode of "load balancing," "priority based," and/or the like may impact the updating of the ECN information.

At operation 706, the apparatus 10 embodied by a UPF, such as UPF 106, or the like, may include means, such as communication interface 40, and/or the like, for transmitting the PDUs comprising the updated ECN information toward a host. See for example, operation 2 of FIG. 6, illustrating traffic transmitted to the host and/or application.

At operation 708, the apparatus 10 embodied by a UPF, such as UPF 106, or the like, may include means, such as processing circuitry 20, communication interface 40, memory 60, and/or the like, for updating Access Traffic Steering, Switching, and Splitting (ATSSS) rule information based on at least the received congestion information for L4S received via the non-3GPP access node. See at least operation 8*a* of FIG. 6. According to certain embodiments, updating the ATSSS rule information is further based on at least one rule or at least one setting provided by a session management function (SMF). In this regard, a rule relating to multi-access (MA) is sent to the UPF (from the SMF) and influences how PDUs are sent over the multiple accesses. A parameter setting therein, such as a steering mode of "load balancing," "priority based," and/or the like may impact the updating of the ATSSS rule information. The rule information is used by SMF to update the ASSS rules sent toward the UE 102, so that the UE 102 can update its traffic distribution accordingly.

At operation 710, the apparatus 10 embodied by a UPF, such as UPF 106, or the like, may include means, such as processing circuitry 20, communication interface 40, memory 60, and/or the like, for providing the updated ATSSS rule information toward a user equipment (UE). See at least operation 8*a* of FIG. 6.

Turning to FIG. 8, at operation 800, the apparatus 10 embodied by a UPF, such as UPF 106, or the like, may include means, such as processing circuitry 20, communication interface 40, memory 60, and/or the like, for receiving congestion information for Low Latency, Low Loss and Scalable Throughput (L4S), via a node configured for non-Third Generation Partnership Project (non-3GPP) access. See for example, at least operation 5*b* of FIG. 6. According to certain embodiments, the congestion information for L4S comprises a percentage of packets the apparatus, such as UPF 106, is directed to use for L4S.

At operation 802, the apparatus 10 embodied by a UPF, such as UPF 106, or the like, may include means, such as processing circuitry 20, communication interface 40, memory 60, and/or the like, for adjusting traffic distribution of downlink protocol data units (PDUs), based on at least the congestion information for L4S, between at least two nodes configured for access, wherein the at least two nodes comprise the node configured for non-3GPP access. Se, for example, at least operation 8*c* of FIG. 6.

At operation 804, the apparatus 10 embodied by a UPF, such as UPF 106, or the like, may include means, such as processing circuitry 20, communication interface 40, memory 60, and/or the like, for based on at least the received congestion information for L4S, and the adjustment of the traffic distribution, updating Explicit Congestion Notification (ECN) information in the downlink PDUs, wherein the downlink PDUs comprising the updated ECN information are transmitted via at least one of the two nodes. See for example, at least operation 8*c* of FIG. 6 regarding updating L4S and/or ECN markings. See also operations 4*a* and 4B regrading transmission of the PDUs via at least one of the nodes configured for access. According to certain embodiments, the updating of the ECN information is further based on congestion information for L4S received via at least another node of the at least two nodes. See, for example, operations 5*a* and 5*b* of FIG. 6. In this regard, according to certain embodiments, the updating of the ECN information comprises combining the congestion information for L4S received via the at least two nodes to determine the updated ECN information. For example, combining the congestion information for L4S may be performed via one or more of a harmonic mean, an arithmetic mean or a weighted mean. According to certain embodiments, updating the ECN information is further based on at least one rule or at least one setting provided by a session management function (SMF). In this regard, a rule relating to multi-access (MA) is sent to the UPF (from the SMF) and influences how PDUs are sent over the multiple accesses. A parameter setting therein, such as a steering mode of "load balancing," "priority based," and/or the like may impact the updating of the ECN information.

FIG. 9 is a flowchart of operations that may be performed by apparatus 10 embodied by a UE 102 according to certain embodiments. At operation 900, the apparatus 10 embodied by a UE, such as UE 102, or the like, may include means, such as processing circuitry 20, communication interface 40, memory 60, and/or the like, for sending, in a request for at least establishment or modification of a multi-access (MA) (PDU) session, an indication that ATSSS and Low Latency, Low Loss and Scalable Throughput (L4S) are enabled for at least the node configured for non-3GPP access. See at least operation 1 of FIG. 6.

At operation 902, the apparatus 10 embodied by a UE, such as UE 102, or the like, may include means, such as processing circuitry 20, communication interface 40, memory 60, and/or the like, for receiving at least one of (a) Access Traffic Steering, Switching, Splitting (ATSSS) rules for distributing traffic between at least two nodes configured for access, the at least two nodes comprising at least one node configured for non-Third Generation Partnership Project (non-3GPP) access, wherein the ATSSS rules are received from a session management function (SMF) and are based on information used for Explicit Congestion Notification (ECN) information provided by a user plane function (UPF)—see at least operation 8*a* of FIG. 6—, or (b) ECN information in protocol data units (PDU) s received via the at least one node configured for non-3GPP access (see at least operations 7*a* and 7*b* of FIG. 6).

At operation 904, the apparatus 10 embodied by a UE, such as UE 102, or the like, may include means, such as processing circuitry 20, communication interface 40, memory 60, and/or the like, for distributing traffic between the at least two nodes based on the at least one of the ATSSS rules or the ECN information (see at least operation 8*b* of FIG. 5). According to certain embodiments, distributing the traffic is further based on one or more local conditions comprising at least one of local congestion, network interface availability, signal loss conditions, or user preferences. According to certain embodiments, distributing the traffic is further based on ECN information received via at least another node of the at least two nodes (see for example, operations 6*a* and 6*b* regarding marking of traffic transmitted in operations 7*a* and 7*b* of FIG. 6). For example, the UE 102 such as with processing circuitry 20 may combine the ECN information received via the at least two nodes by combining the ECN information via one or more of a harmonic mean, an arithmetic mean or a weighted mean.

At operation 906, the apparatus 10 embodied by a UE, such as UE 102, or the like, may include means, such as processing circuitry 20, communication interface 40, memory 60, and/or the like, for updating Explicit Congestion Notification (ECN) information in downlink PDUs, wherein the ECN information in the downlink PDUs indicates uplink congestion at one or more of the at least two nodes, and is based on one or more of: (a) the ECN information received via the at least one node configured for non-3GPP access, or (b) the traffic distribution performed by the apparatus, wherein the downlink PDUs comprising the updated ECN information indicating the uplink congestion are transmitted toward a host. According to certain embodiments, updating the ECN information is further based on one or more local conditions comprising at least one of local congestion, network interface availability, signal loss conditions, or user preferences. According to certain embodiments, updating the ECN information is further based on ECN information received via at least another node of the at least two nodes. For example, the UE 102 such as with processing circuitry 20 may combine the ECN information received via the at least two nodes via one or more of a harmonic mean, an arithmetic mean or a weighted mean.

Example embodiments disclosed herein provide numerous improvements to a network, such as improving the ability of the UE 102 and/or UPF 106 to redistribute network traffic in a manner which reduces latency and packet loss. Example embodiments enable the network to redistribute traffic toward either of at least two accesses in a multi-access session, including a non-3GPP access, and further enable congestion information marking by the access to enable further adjustments to traffic distribution.

FIGS. 6-9 illustrate message flows, call flows, or signal diagrams, according to certain example embodiments of the present disclosure. It will be understood that each block of the flows may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 60 of an apparatus 10 employing an embodiment of the present disclosure and executed by a processing circuitry 20. As will be appreciated, any such computer program instructions may be loaded onto a computer or other programmable apparatus (for example, hardware) to produce a machine, such that the resulting computer or other programmable apparatus implements the functions specified in the figures. These computer program instructions may also be stored in a computer-readable memory that may direct a computer or other programmable apparatus to function in a particular manner, such that the instructions stored in the computer-readable memory produce an article of manufacture the execution of which implements the function specified in the figures. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the figures.

Accordingly, blocks of the figures and flows support combinations of means for performing the specified functions and combinations of operations for performing the specified functions for performing the specified functions. It will also be understood that one or more blocks of the figures, and combinations of blocks in the figures, can be implemented by special purpose hardware-based computer systems which perform the specified functions, or combinations of special purpose hardware and computer instructions.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although several variations have been described in detail above, other modifications or additions are possible. Further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It should therefore again be emphasized that the various embodiments described herein are presented by way of illustrative example only and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

As used herein, "at least one of the following: <a list of two or more elements>" and "at least one of <a list of two or more elements>” and similar wording, where the list of two or more elements are joined by “and” or “or”, mean at least any one of the elements, or at least any two or more of the elements, or at least all the elements.

What is claimed is:

1. An apparatus for a communication network, the apparatus comprising:

at least one processor; and at least one memory comprising computer executable instructions that, when executed by the at least one processor, cause the apparatus to perform the following operations:

sending, in a request for establishment or modification of a multi-access Protocol Data Unit (MA PDU) session, an indication that Access Traffic Steering, Switching, Splitting (ATSSS) and Low Latency, Low Loss and Scalable Throughput (L4S) are enabled for a service data flow over a Third Generation Partnership Project (3GPP) access node and an untrusted non-3GPP access node terminated by a Non-3GPP Interworking Function (N3IWF);

receiving (a) Access Traffic Steering, Switching, Splitting (ATSSS) rules for distributing traffic for transmission to at least two nodes configured for access, the at least two nodes comprising the 3GPP access node and the untrusted non-Third Generation Partnership Project (non-3GPP) access node terminated by the N3IWF, wherein the ATSSS rules are received from a session management function (SMF) and are based on information used for Explicit Congestion Notification (ECN) information provided by a user plane function (UPF), wherein the ATSSS rules specify a Load Balancing steering mode and include a first percentage of the service data flow to transmit over the 3GPP access node and a second percentage of the service data flow to transmit over the untrusted non-3GPP access node, and (b) ECN information in protocol data units (PDUs) received via the untrusted non-3GPP access node terminated by the N3IWF, wherein the ECN information comprises L4S ECN marking information indicating congestion associated with the untrusted non-3GPP access node;

determining, by the UE, a revised traffic split for uplink PDUs of the service data flow by combining the ECN information received via the untrusted non-3GPP access node with ECN information received via the 3GPP access node using a weighted mean, and further based on at least one local condition of the UE selected from local congestion, network interface availability, signal loss conditions, or user preferences;

distributing the uplink PDUs of the service data flow for transmission to the at least two nodes based on revised traffic split instead of the first percentage and the second percentage specified by the ATSSS rules; and before providing downlink PDUs to an application host of the UE, updating ECN information in the downlink PDUs based on the revised traffic split and the ECN information received via the untrusted non-3GPP access node, wherein the updated ECN information indicates uplink congestion at one or more of the at least two nodes.

2. A method comprising:

sending, in a request for establishment or modification of a multi-access Protocol Data Unit (MA PDU) session, an indication that Access Traffic Steering, Switching, Splitting (ATSSS) and Low Latency, Low Loss and Scalable Throughput (L4S) are enabled for a service data flow over a Third Generation Partnership Project (3GPP) access node and an untrusted non-3GPP access node terminated by a Non-3GPP Interworking Function (N3IWF);

receiving (a) Access Traffic Steering, Switching, Splitting (ATSSS) rules for distributing traffic between at least two nodes configured for access, the at least two nodes comprising the 3GPP access node and the untrusted non-Third Generation Partnership Project (non-3GPP) access node terminated by the N3IWF, wherein the ATSSS rules are received from a session management function (SMF) and are based on information used for Explicit Congestion Notification (ECN) information provided by a user plane function (UPF), wherein the ATSSS rules specify a Load Balancing steering mode and include a first percentage of the service data flow to transmit over the 3GPP access node and a second percentage of the service data flow to transmit over the untrusted non-3GPP access node, and (b) ECN information in protocol data units (PDU) s received via untrusted non-3GPP access node terminated by the N3IWF, wherein the ECN information comprises L4S ECN marking information indicating congestion associated with the untrusted non-3GPP access node;

determining, by the UE, a revised traffic split for uplink PDUs of the service data flow by combining the ECN information received via the untrusted non-3GPP access node with ECN information received via the 3GPP access node using a weighted mean, and further based on at least one local condition of the UE selected from local congestion, network interface availability, signal loss conditions, or user preferences;

distributing the uplink PDUs of the service data flow for transmission to the at least two nodes based on revised traffic split instead of the first percentage and the second percentage specified by the ATSSS rules; and before providing downlink PDUs to an application host of the UE, updating ECN information in the downlink PDUs based on the revised traffic split and the ECN information received via the untrusted non-3GPP access node, wherein the updated ECN information indicates uplink congestion at one or more of the at least two nodes.

3. The method of claim 2, wherein the request for establishment or modification of the MA PDU session comprises a PDU Session Establishment Request or a PDU Session Modification Request that identifies the service data flow for which ATSSS and L4S are enabled.

4. The method of claim 3, wherein the untrusted non-3GPP access node terminated by the N3IWF comprises the N3IWF, and wherein the L4S ECN marking information received via the untrusted non-3GPP access node is provided by the N3IWF.

5. The method of claim 4, wherein the ECN information received via the 3GPP access node and the ECN information received via the untrusted non-3GPP access node are independently determined by the 3GPP access node and the untrusted non-3GPP access node without knowledge of ECN marking performed by the other of the 3GPP access node or the untrusted non-3GPP access node.

6. The method of claim 5, wherein the ECN information received via the untrusted non-3GPP access node comprises information indicating a percentage of packets to be marked for L4S.

7. The method of claim 6, wherein the at least one local condition of the UE comprises local congestion experienced by the UE.

8. The method of claim 6, wherein the at least one local condition of the UE comprises availability of a network interface of the UE for communicating via at least one of the 3GPP access node or the untrusted non-3GPP access node.

9. The method of claim 6, wherein the at least one local condition of the UE comprises a signal loss condition associated with at least one of the 3GPP access node or the untrusted non-3GPP access node.

10. The method of claim 6, wherein the at least one local condition of the UE comprises a user preference indicating a preferred access for the service data flow.

11. The method of claim 10, wherein distributing the uplink PDUs of the service data flow comprises altering a split of the uplink PDUs between the 3GPP access node and the untrusted non-3GPP access node without switching all uplink PDUs of the service data flow from one of the 3GPP access node or the untrusted non-3GPP access node to the other of the 3GPP access node or the untrusted non-3GPP access node.

* * * * *